(12) United States Patent
Steinway et al.

(10) Patent No.: US 7,109,910 B1
(45) Date of Patent: Sep. 19, 2006

(54) MINE DETECTION USING RADAR VIBROMETER

(75) Inventors: William Steinway, Smyrna, GA (US); Waymond Scott, Lilburn, GA (US)

(73) Assignee: L-3 Communications CyTerra Corporation, Orlando, FL (US)

( * ) Notice: Subject to any disclaimer, the term of this patent is extended or adjusted under 35 U.S.C. 154(b) by 0 days.

(21) Appl. No.: 10/656,808

(22) Filed: Sep. 8, 2003

Related U.S. Application Data

(60) Provisional application No. 60/408,269, filed on Sep. 6, 2002.

(51) Int. Cl.
*G01S 13/88* (2006.01)

(52) U.S. Cl. .................................................. 342/22

(58) Field of Classification Search ................ 367/128; 342/22, 52, 27; 89/1.13
See application file for complete search history.

(56) References Cited

U.S. PATENT DOCUMENTS

| | | | |
|---|---|---|---|
| 5,646,907 A * | 7/1997 | Maccabee | 367/128 |
| 5,754,494 A * | 5/1998 | Gallagher | 367/87 |
| 6,069,843 A * | 5/2000 | DiMarzio et al. | 367/128 |
| 6,809,991 B1 * | 10/2004 | Pepper et al. | 367/149 |
| 6,838,671 B1 * | 1/2005 | Compana et al. | 250/439 |
| 6,914,552 B1 * | 7/2005 | McEwan | 342/22 |

OTHER PUBLICATIONS

D. M. Donskoy et al., "Nonlinear Seismo-Acoustic Land Mine Detection: Field Test"; Proceedings of SPIE—The International Society of Optical Engineering; Detection and Remediation Technologies for Mines and Minelike Targets VII; vol. 4742; pp. 685-694; (Apr. 1-5, 2000).

A. K. Hocaoglu et al.; "Continuous Processing Of Acoustic Data For Land Mine Detection"; Proceedings of SPIE—The International Society of Optical Engineering; Detection and Remediation Technologies for Mines and Minelike Targets VII; vol. 4742; pp. 654-664; (Apr. 1-5, 2002).

J. M. Keller et al; "Fourier Descriptor Features For Acoustic Land Mine Detection"; Proceedings of SPIE—The International Society of Optical Engineering; Detection and Remediation Technologies for Mines and Minelike Targets VII; vol. 4742; pp. 673-684; (Apr. 1-5, 2002).

A. K. Lai, "Whole-Field Laser Vibrometer For Buried Land Mine Detection"; Proceedings of SPIE—The International Society of Optical Engineering; Detection and Remediation Technologies for Mines and Minelike Targets VII; vol. 4742; pp. 640-648; (Apr. 1-5, 2002).

G. D. Larson et al.; Characterization Of Elastic Wave Propagation In Soil; Proceedings of SPIE—The International Society of Optical Engineering; Detection and Remediation Technologies for Mines and Minelike Targets VII; vol. 4742; pp. 629-639; (Apr. 1-5, 2002).

(Continued)

*Primary Examiner*—Daniel Pihulic

(74) *Attorney, Agent, or Firm*—Fish & Richardson P.C.

(57) ABSTRACT

A frequency-stepped radar may be used to detect buried landmines by sequentially inducing vibrations of different frequencies in the landmine. A sensor detects signals associated with the vibrations, and a processor processes the signals to detect the landmine.

15 Claims, 3 Drawing Sheets

OTHER PUBLICATIONS

S. H. Lee et al., "Technical Issues Associated With The Detection Of Buried Landmines With High-Frequency Seismic Waves"; Proceedings of SPIE—The International Society of Optical Engineering; Detection and Remediation Technologies for Mines and Minelike Targets VII; vol. 4742; pp. 617-628; (Apr. 1-5, 2002).

J. S. Martin et al.; "Ultrasonic Displacement Sensor For The Seismic Detection Of Buried Land Mines"; Proceedings of SPIE—The International Society of Optical Engineering; Detection and Remediation Technologies for Mines and Minelike Targets VII; vol. 4742; pp. 606-616; (Apr. 1-5, 2002).

J. M. Sabatier et al.; "Linear And Nonlinear Acoustic Velocity Profiles Over Buried Land Miners"; Proceedings of SPIE—The International Society of Optical Engineering; Detection and Remediation Technologies for Mines and Minelike Targets VII; vol. 4742; pp. 695-700; (Apr. 1-5, 2002).

T. V. Writer, "Mine Detection With A Forward Moving Portable Doppler Vibrometer"; Proceedings of SPIE—The International Society of Optical Engineering; Detection and Remediation Technologies for Mines and Minelike Targets VII; vol. 4742; pp. 649-653; (Apr. 1-5, 2002).

N. Xiang et al; "Recursive model-based target recognition for acoustic land mine detection"; Proceedings of SPIE—The International Society of Optical Engineerings; Detection and Remediation Technologies for Mines and Minelike Targets VII; vol. 4742; pp. 665-672; (Apr. 1-5, 2002).

S. H. Yu et al.; "Physically Based Method For Automatic Mine Detection Using Acoustic Data: A Transmission Zero Approach"; Proceedings of SPIE—The International Society of Optical Engineering; Detection and Remediation Technologies for Mines and Minelike Targets VII; vol. 4742; pp. 701-708; (Apr. 1-5, 2002).

* cited by examiner

MINE DETECTION USING RADAR VIBROMETER

CROSS-REFERENCE TO RELATED APPLICATIONS

This application claims priority from U.S. Provisional Application No. 60/408,269, filed Sep. 6, 2002, and titled RADAR VIBROMETER, which is incorporated by reference.

TECHNICAL FIELD

This application is directed to detecting buried landmines.

BACKGROUND

It is known that, when vibrations are induced into the ground in the local area of a buried landmine, the landmine disrupts the vibration pattern that propagates across the surface of the ground. In addition, the landmine itself vibrates. This vibration can be sensed for the purpose of detecting the landmine. Problems associated with sensing and detecting buried landmines may include an inability to sense the received vibrations when foliage is covering the buried landmine, ground roughness effects that cause 'speckle' clutter, and interference by outside vibration sources (e.g., equipment fans, engines and fluorescent lights) that are located a distance away from the landmine.

SUMMARY

A frequency-stepped radar may be used to detect buried landmines by sequentially inducing vibrations of different frequencies in the landmine. A sensor detects signals associated with the vibrations, and a processor processes the signals to detect the landmine.

Other features will be apparent from the following description, including the drawings, and the claims.

DETAILED DESCRIPTION

Figure 1:
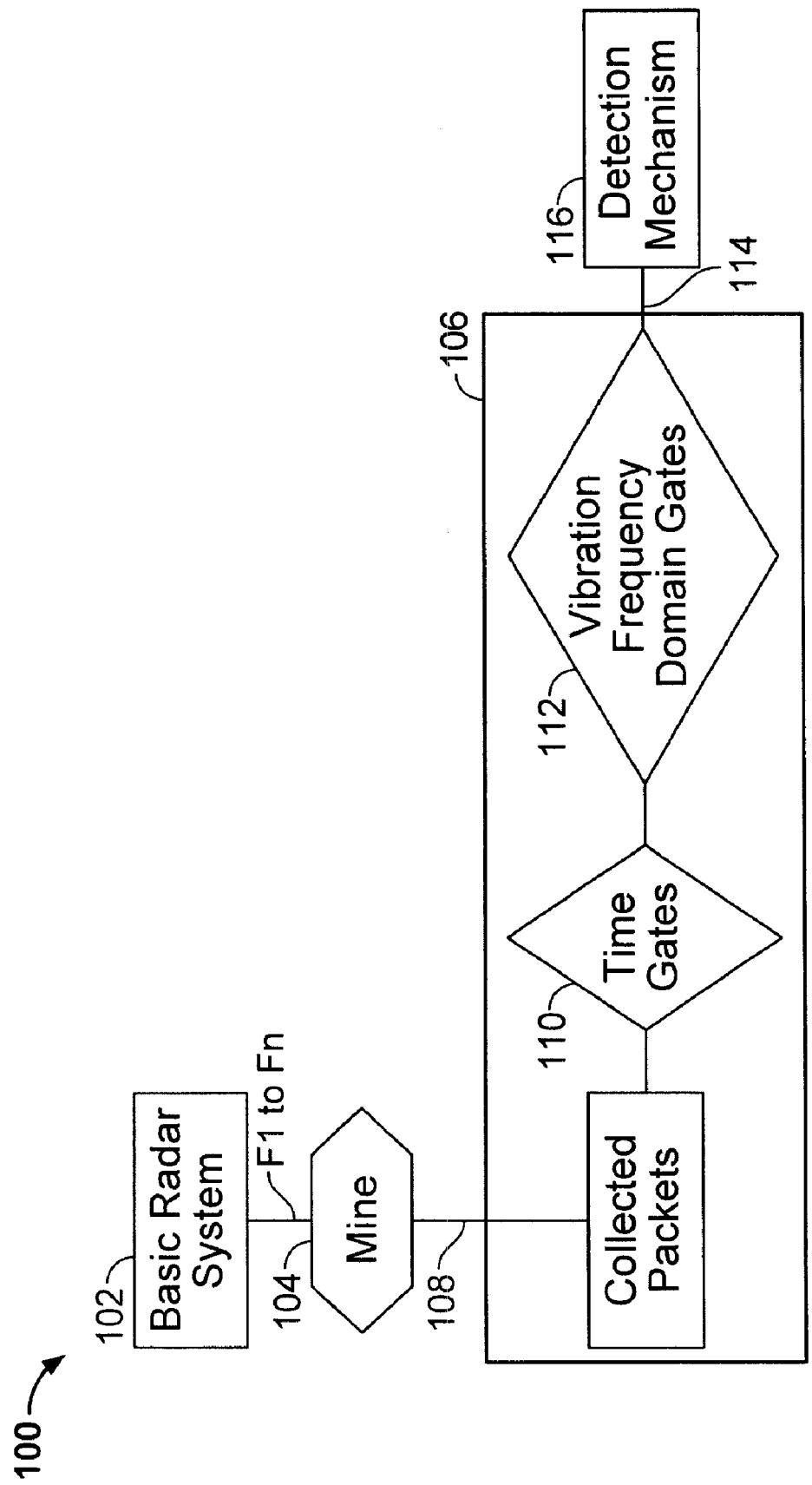
FIG. 1 is a block diagram of a radar sensor system.

FIG. 1 is a block diagram of a radar sensor system 100 that may be used to detect buried landmines by detecting vibrations associated with the buried landmines. The system includes a basic radar system 102 that directs radio frequency (RF) pulses at a mine 104 for the purpose of receiving and analyzing signals reflected by the mine. The basic radar system 102 propagates one frequency at a time, stepping through a number of predetermined frequencies that are chosen to minimize attenuation of the signals due to foliage and soil so as to obtain maximum sensitivity. The radar system 102 steps through "n" frequencies that are designated as F1 to Fn. At each frequency, the radar becomes a continuous wave (CW) radar, which permits a coherent measurement of the magnitude and phase of the received signal to be made at that frequency. In general, the radar signal is propagated and processed in a phase coherent manner to aid in detecting the slight movement of the surface of the ground that results from the vibrating landmine.

To measure the distance to unwanted objects or clutter, the radar signal includes bandwidth sufficient to enable conversion of the signal into a time-resolved measurement so that signal components related to the unwanted objects or clutter can be time-gated out or removed from the desired signal that represents the vibrating buried landmine. The total bandwidth of the radar is determined by the difference between the highest and lowest propagated frequencies. One implementation is able to propagate frequencies from 200 MHz up to 6000 MHz, with typical step sizes from 1 MHz to 20 MHz. Frequencies that penetrate foliage and soils are typically 200 MHz to 3500 MHz, while higher frequencies generally have more attenuation, which makes them less useful.

A receiver 106 collects measurement packets 108, which include real and imaginary values of a received signal, at each of the frequencies F1 to Fn. The measurement packets 108 are collected by the receiver 106 over time at a packet rate.

The receiver 106 processes the measurement packets 108 to enhance the desired vibration response by applying time gates 110 and vibration-frequency-domain gates 112. Time gating or 'range' gating of clutter in the signal of the measurement packets 108 removes clutter from the signal. Time gating is enabled by the extended bandwidth of the frequency-stepped radar. The vibration-frequency-domain gates 112 are enabled when individual frequency data is processed over a number of contiguous samples. Processing all the frequencies, F1 to Fn, allows 'speckle' effects to be removed, which results in a signal 114 which represents only vibrations associated with the mine 102. A detection mechanism 116 analyzes the signal 114 to determine whether a mine 102 is present.

Figure 2:
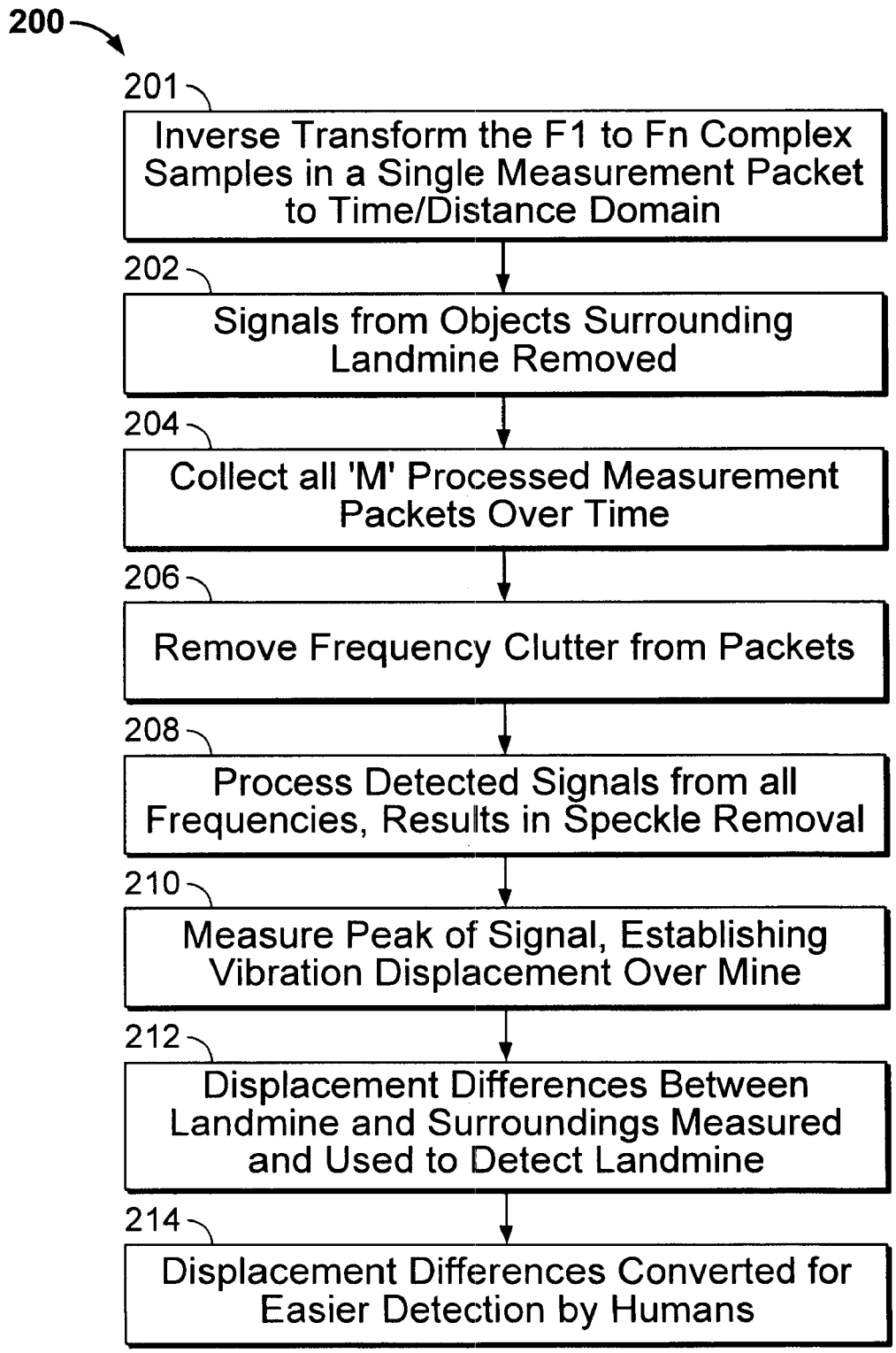
FIG. 2 is a flow chart of a procedure performed by the system of FIG. 1.

Referring to FIG. 2, the system 100 operates according to a procedure 200. Initially, an inverse transform is used to translate the F1 to Fn complex samples contained in a single measurement packet into the time/distance domain (201). In one implementation, this is done using an inverse fast Fourier transformation (IFFT) that produces 'm' complex data samples for each packet.

Next, time gating is achieved by removing signals from objects that are at a time or distance before or after that of the buried landmine (202). This is done by setting to zero complex samples that are at those times or distances. The complex samples then are transformed back into the original signal domain. In one implementation, this is done using an 'm' point complex data FFT.

Next, 'M' measurement packets, each of which has been processed as described above, are collected (204). Once the measurement packets are collected, vibration frequency gating is achieved by processing 'M' measurement samples of complex data collected from each of the frequencies by transforming the 'M' measurement samples to the frequency domain and removing the frequency components associated with clutter (i.e., all of the targets/clutter that are not vibrating and all that are vibrating/moving too fast) (206). This is done for each of frequencies F1 to Fn. When a Fast Fourier Transform ("FFT") is used to transform the samples to the frequency domain, there are 'n'FFTs that each have 'M' complex data samples. After the FFT process, selected complex samples are set to zero to remove from the reflected signal all fixed or stationary objects and clutter that is moving too fast to be the vibrating landmine. The use of FFT processing is only one of many ways to obtain time gating and vibration frequency gating.

Detection of the vibration signal, which is one of the few things left in the data that has not been filtered or removed, can then be accomplished by threshold detection. Initially, speckle removal is achieved by processing and averaging the detected signals from all of the frequency steps (208).

The peak of the resulting signal then is measured to establish the vibration displacement over the buried landmine (210). The vibration displacement of the landmine and the ground near the buried landmine is different than that away from the landmine because the landmine's mechanical properties are quite different from those of the soil. These differences in vibration displacement are measured by the radar and used to detect the landmine (212). The vibration displacement may be provided to an operator as an audible signal so that the operator can hear the change of the vibration displacement due to the mine, or the vibration displacement may be fed into signal processing algorithms that detect the differences in the vibration signature and signal the operator when a landmine is present (214). The frequency stepped radar with the wide band coverage and coherent processing makes vibration detection possible. Additional benefits are gained when the frequency band selected is low enough to penetrate soils, foliage, and debris clutter on the surface of the ground.

Figure 3:
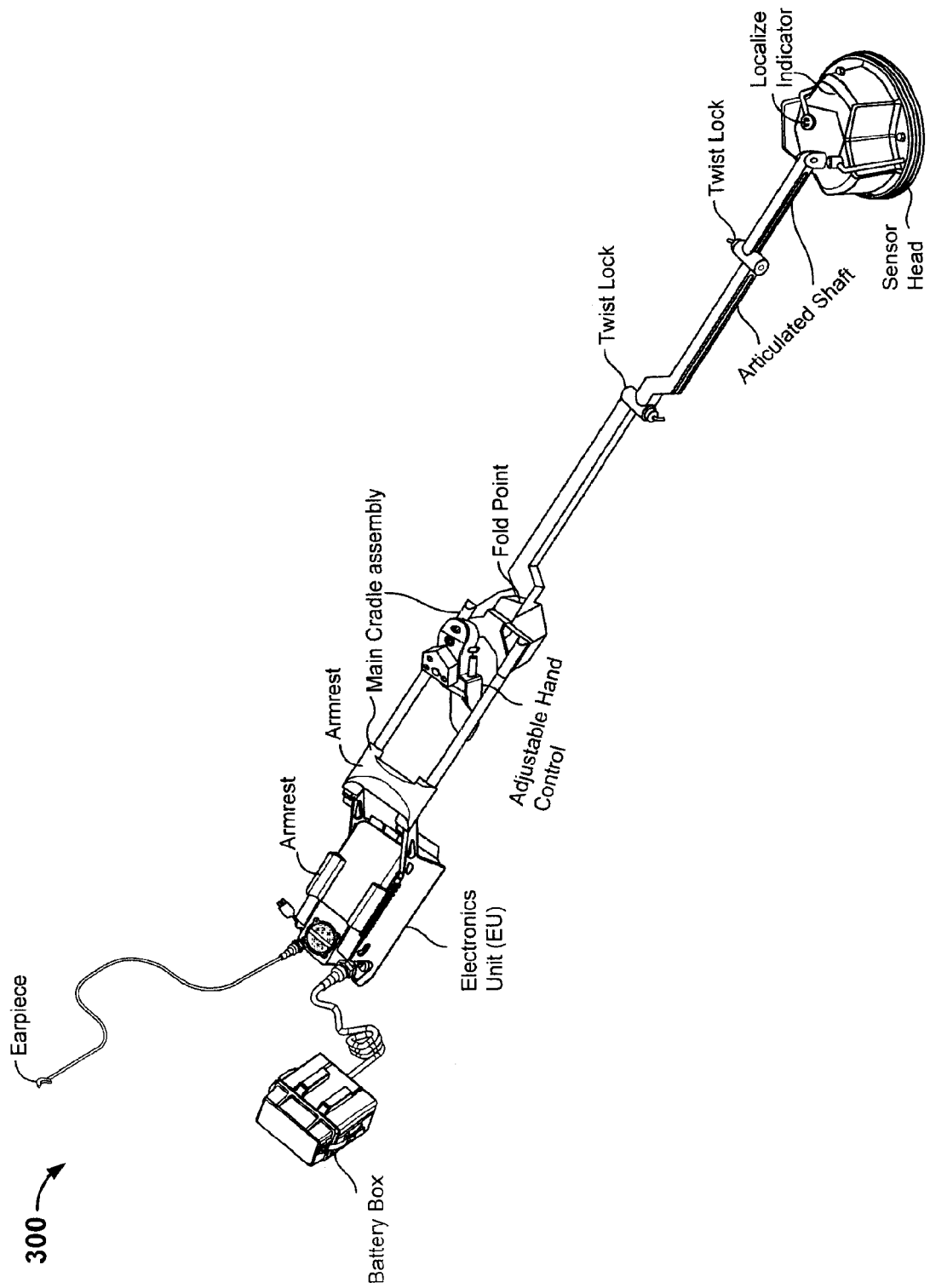
FIG. 3 is a diagram of a handheld standoff mine detection system (HSTAMIDS).

FIG. 3 illustrates a handheld mine detector 300 that integrates a metal detection (MD) sensor and a basic ground penetrating radar (GPR) sensor. A frequency-stepped, phase coherent GPR may be used to provide a radar vibrometer mode for use in conjunction with the mine detector 300. The frequencies of the radar are chosen to penetrate the debris and foliage that typically are present in a mine field, and to detect plastic and metal landmines. The data collected in the radar vibrometer mode can be processed as described above to obtain vibration frequency detection.

The radar vibrometer mode takes about 3 to 5 seconds to identify and confirm the presence of a mine. By comparison, a metal detector, alone or in conjunction with a basic ground penetrating radar, may be used to find the mine in real time. In one implementation, the system 300 uses a metal detector and a basic ground penetrating radar to find a possible mine, and then switches to the radar vibrometer mode to confirm the presence of the mine.

The radar vibrometer mode adds improved detection capability to the detector 300 with relatively little additional cost. The radar vibrometer mode uses virtually the same radar hardware; only the software is different. As noted, once the dual sensors of MD and GPR sense a possible mine, the same radar unit can then be used as a radar vibrometer to confirm the presence of the mine.

A number of implementations have been described. Nevertheless, it will be understood that vaious modifications may be made. Accordingly, other implementatioins are within the scope of the following claims.

What is claimed is:

1. A method comprising:
   using a frequency-stepped radar to sequentially induce vibrations of different frequencies in a landmine;
   detecting electromagnetic signals associated with the vibrations; and
   processing the detected electromagnetic signals to detect the landmine, the processing including measuring a peak of a processed signal to determine vibration displacement.

2. The method of claim 1 further comprising removing, from the detected signals, signal components related to frequency clutter that is not associated with a buried landmine.

3. The method of claim 1 further comprising processing detected signals from all frequencies to reduce speckle effects.

4. The method of claim 1 further comprising converting the determined vibration displacement to an audible signal.

5. The method of claim 1 further comprising identifying whether the determined vibration displacement is consistent with a landmine.

6. The method of claim 5 wherein identifying whether the determined vibration displacement is consistent with a landmine comprises:
   comparing the determined vibration displacement with a previously determined vibration displacement; and
   identifying that the determined vibration displacement is consistent with a landmine in response to a result of the comparison that exceeds a threshold difference.

7. The method of claim 1 further comprising presenting an audible signal when a landmine is detected.

8. A system comprising:
   a frequency-stepped radar configured to induce vibrations in a landmine using different frequencies;
   a sensor configured to detect electromagnetic signals associated with the vibrations; and
   a processor configured to process the detected electromagnetic signals to detect the landmine, the processor being further configured to measure a peak of a processed signal to determine vibration displacement.

9. The system of claim 8 further comprising a metal detection sensor configured to detect metal.

10. The system of claim 8 wherein the processor is further configured to remove, from the detected signals, signal components related to frequency clutter that is not associated with a buried landmine.

11. The system of claim 8 wherein the processor is further configured to process detected signals from all frequencies to reduce speckle effects.

12. The system of claim 8 the processor is further configured to convert the determined vibration displacement to an audible signal.

13. The system of claim 8 the processor is further configured to identify whether the determined vibration displacement is consistent with a landmine.

14. The system of claim 13 wherein the processor is further configured to:
   compare the determined vibration displacement with a previously determined vibration displacement; and
   identify that the determined vibration displacement is consistent with a landmine in response to a result of the comparison that exceeds a threshold difference.

15. The system of claim 8 the processor is further configured to present an audible signal when a landmine is detected.

* * * * *